Patented June 24, 1941

2,246,889

UNITED STATES PATENT OFFICE 2,246,889

STRUCTURAL ISOMER OF PROGESTERONE

Karl Miescher, Riehen, and Hans Kaegi, Basel, Switzerland, assignors, by mesne assignments, to Ciba Pharmaceutical Products, Incorporated, Summit, N. J., a corporation of New Jersey No Drawing. Application February 21, 1939, Serial No. 257,735. In Switzerland March 2, 1938

1 Claim. (Cl. 260—397.3)

This invention relates to the manufacture of a structural isomer of progesterone by treating neopregnenolones or neopregnene-diols, i. e. structural isomers of pregnenolones or pregnene-diols with an oxidizing agent or a dehydrogenating agent respectively.

The parent materials may be made, for example, by the reaction of unsaturated 3-acyl-oxy-10:13-dimethylcyclopentano-polyhydrophenanthrene-17-ketones with $\alpha:\alpha$-dihalogencarboxylic acid derivatives followed by elimination of hydrogen halide, saponification and decarboxylation. The unsaturated neopregnanolones thus obtainable may be converted by the action of reducing agents, for instance catalytically (by means of hydrogen activity by nickel or palladium) by an alkali metal and an alcohol or according to the Meerwein-Ponndorf method by means of a metal alcoholate in presence of an alcohol, into the said unsaturated neopregnane-diols. As parent materials there may be used oxyketones and polyols of the unsaturated neopregnane series. Alternatively, there may be used as a parent material a mixture of saturated and unsaturated neopregnane and pregnane compounds such as a mixture of neopregnenolone with pregnenolone. Upon the oxidation product obtainable therefrom the neoprogesterone may be separated, for example by fractional crystallisation. The oxidation may be performed with any of the agents known to be suitable for this reaction, for example with chromic acid and glacial acetic acid, with permanganate, a metal or a metal oxide of the copper, iron or platinum group, also zinc or a mixture of any of these metals or an alloy thereof, if desired under diminished pressure in presence of an inert gas and/or in combination with a hydrogen acceptor, for instance a ketone, an aldehyde or an unsaturated compound. Furthermore, there may be used with advantage metal alcoholates in presence of carbonyl compounds such as for instance alcoholates of aluminium and magnesium in presence of acetone, cyclohexanone and so on.

When oxidation is to be carried out it is to be recommended in general that double bonds present should be temporarily protected. In most cases such a protection is secured by addition of halogen or hydrogen halide. After the oxidation the double bond may be restored by treatment with an agent that eliminates halogen or hydrogen halide, for instance zinc dust and acetic acid or an alcohol, an alkali iodide or catalytically activated hydrogen or a tertiary base, for instance pyridine or dimethylaniline, or a salt of carboxylic acid, for instance an alkali acetate, on the other hand. If the protected double bond is in $\beta:\gamma$-position to a newly produced keto-group there may be first obtained a $\beta:\gamma$-unsaturated ketone by eliminating halogen in neutral solution, for instance by means of zinc dust and alcohol. If desired, this ketone may be subsequently converted by an acid or basic agent into an $\alpha:\beta$-unsaturated ketone such as is directly obtained by dehalogenation in acid or basic medium.

The structural isomer of progesterone produced in this invention is useful in therapeutics or as an intermediate for making the compounds useful in therapeutics. This is the more astonishing as it is known that a very little change of the progesterone molecule diminishes the activity. Thus $\Delta^1$-progesterone is known to be completely inactive. Moreover, it is very surprising that the oxidation of neopregnenolone should lead to a new highly active body similar to progesterone, seeing that by oxidation of isopregnenolone merely the known progesterone is obtained.

The following examples illustrate the invention, the parts being by weight:

Example 1

0.65 part of neopregnenolone are dissolved in 10 parts of glacial acetic acid and after addition of 0.32 part of bromine there is added a solution of 0.2 part of chromium trioxide in 2 parts of acetic acid. After the mixture has stood for 48 hours at room temperature it is debrominated by heating for ¼ hour with 2 grams of zinc dust; it is then filtered and the filtrate is precipitated by addition of water. This precipitate is filtered by suction and recrystallized several times from alcohol. There is thus obtained a new structural isomer of the known progesterone, namely neoprogesterone of melting point 217–218° C. and specific rotation $[\alpha]_D=+48°$ in chloroform.

If the debromination is conducted instead of in glacial acetic acid with caution in a neutral medium, for instance alcohol, there is obtained an unsaturated compound which, if desired, may subsequently be converted by action of an alkaline or an acid agent, for instance alcoholic hydrochloric acid, into the aforesaid $\alpha:\beta$-unsaturated compound.

Example 2

2 parts of neopregnenolone, 25 parts of aluminium tertiary butylate, 120 parts of acetone and 300 parts of benzene are heated together to boiling under reflux for 15 hours. The cooled benzene solution is extracted with dilute sulfuric acid and evaporated in a vacuum. The residue is mixed with ether. The crystalline powder is filtered and recrystallized from alcohol. There is thus obtained the neoprogesterone described in Example 1.

Instead of acetone there may be used also another carbonyl compound, such as cyclohexanone and instead of aluminium tertiary butylate also another metal alcoholate.

*Example 3*

If in Example 1 instead of the neopregnenolone there is used a mixture thereof with pregnenolone which has a specific rotation of $-22°$ there is obtained a mixture of neoprogesterone with progesterone, from which the former may be separated in a pure condition best by fractional crystallisation from acetic ether.

What we claim is:

The structural isomer of progesterone which corresponds to the empirical formula $C_{21}H_{30}O_2$, has a melting point of 217–218° C., and has a specific rotation of $[\alpha]_D = +48°$ in chloroform.

KARL MIESCHER.
HANS KAEGI.